Patented Dec. 14, 1948

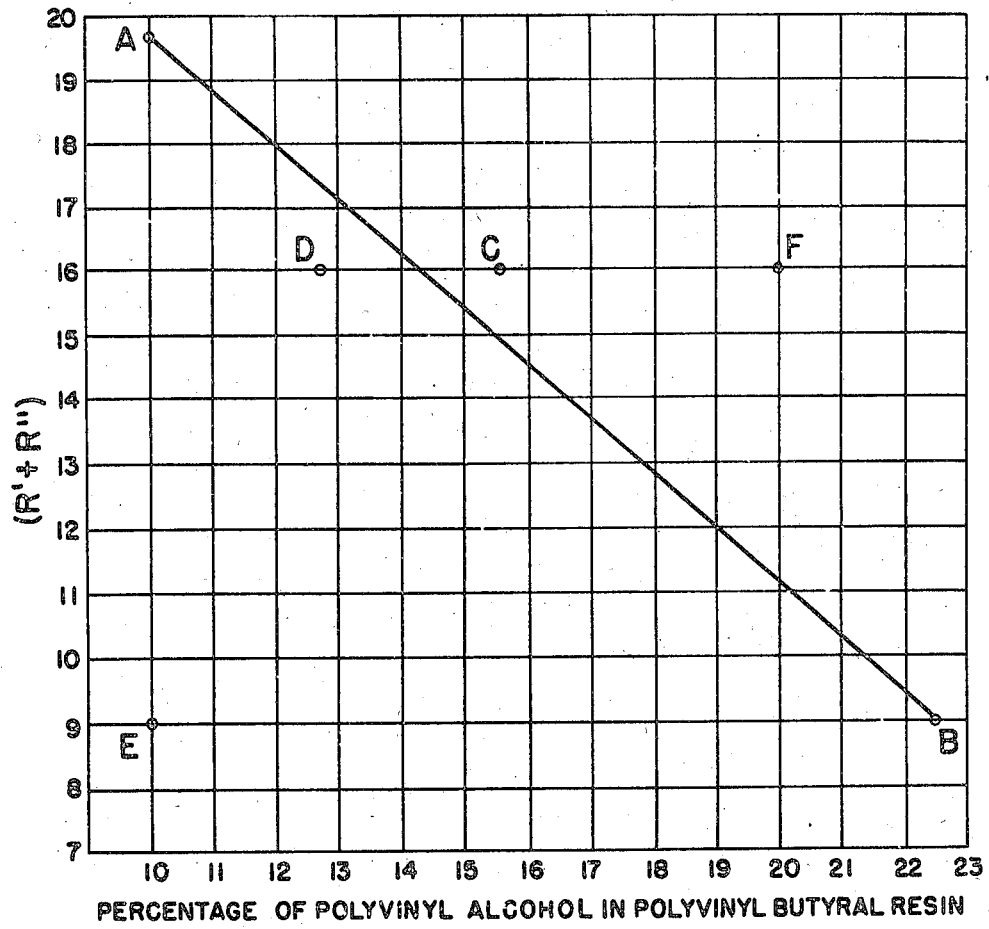

2,456,366

UNITED STATES PATENT OFFICE 2,456,366

PLASTICIZED POLYVINYL ACETAL COMPOSITIONS

Bozetech C. Bren, West Caldwell, and Jesse O. White, Arlington, N. J., assignors to E. I. du Pont de Nemours & Company, Wilmington, Del., a corporation of Delaware Application July 26, 1946, Serial No. 686,366

8 Claims. (Cl. 260—32.2)

This invention relates to plasticized polyvinyl acetal compositions and, more particularly, to plasticized polyvinyl butyral compositions adapted for use in safety glass interlayer sheeting.

Polyvinyl acetal resins are commonly used in safety glass interlayer sheeting, the usual composition being a polyvinyl butyral containing about 40 to 45 parts of plasticizer to 100 parts of the polyvinyl butyral resin. More specifically, the polyvinyl butyral resin contains a residual content of polyvinyl acetate not in excess of 2% by weight of the resin while the determining element in the constitution of the resin is the percentage of unconverted polyvinyl alcohol which normally runs from 10% to 22%, more specifically from about 17% to 20%, by weight.

A plasticizer for polyvinyl acetal compositions, particularly for safety glass interlayer sheeting, should give a composition, in combination with the polyvinyl acetal resin, which is tough throughout a wide range of temperatures, and, also, the plasticizer must be compatible with the polyvinyl acetal resin in the proportion used so it will not tend to exude under conditions of service.

An object of the present invention is to provide a new and improved plastic composition, more particularly one adapted for use in safety glass interlayer sheeting. A further object is to provide an improved polyvinyl acetal composition. A still further object is to provide a new polyvinyl butyral composition adapted for use in safety glass interlayer sheeting and characterized by its retention of toughness at very low temperatures. A still further object is to provide a new plasticizer for polyvinyl acetal resins, specifically for polyvinyl butyral resins. Other objects will be apparent from the description of the invention given hereinafter.

The above objects are accomplished according to the present invention by the use, as plasticizers for polyvinyl acetal resins, of primary alkyl acyl glycolates having the formula R'COOCH$_2$COOR" in which R' and R" are alkyl groups, R' has from 7 to 17 carbon atoms, inclusive, R" has from 1 to 6 carbon atoms, inclusive, and the total of carbon atoms in R' and R" is at least 9. More specifically, the invention comprises a plastic composition adapted for use in safety glass interlayer sheeting and comprising polyvinyl butyral resin plasticized with a mixture of primary alkyl acyl glycolates obtained by esterification of the mixture of saturated aliphatic acids resulting from the saponification of coconut oil, either in admixture with lauryl alcohol where the plasticizer tends to exude, or alone in the case where the mixture of glycolates has been selected to avoid any tendency to exude.

It has been discovered that primary alkyl acyl glycolates which are sufficiently non-volatile, form excellent plasticizers for polyvinyl acetal resins and, especially, for polyvinyl butyral resins of the type used in interlayer sheeting for safety glass. These glycolates may be used alone or in admixture with each other and they should be selected to exclude those which tend to cause exudation of the plasticizer under ordinary conditions of use or, alternatively, a proportion of lauryl alcohol should be admixed with the mixture of glycolates. These plasticizers used in proportions around 40 parts or more to 100 parts of polyvinyl butyral resin, give a plastic which retains its toughness at extremely low temperatures to a notable degree.

While it is obviously not necessary that the saturated aliphatic acids be obtained by saponification of coconut oil, commercially this is an economical and convenient source and the mixture of acids so obtained may be used, as will be explained in more detail, rather than having to separate the individual acids and using them. The acids derivable from coconut oil are chiefly saturated aliphatic acids of even numbers of carbon atoms between 8 and 18, inclusive, although some variation both as to the acids included in the mixture and their proportions therein are indicated by the following analyses:

|  | (a) | (b) |
|---|---|---|
| caproic (C$_6$) | 0.4 | none found |
| caprylic (C$_8$) | 8.7 | 9.5 |
| capric (C$_{10}$) | 5.6 | 4.5 |
| lauric (C$_{12}$) | 45.0 | 51.0 |
| myristic (C$_{14}$) | 17 | 18.5 |
| palmitic (C$_{16}$) and higher | 23 |  |
| palmitic (C$_{16}$) |  | 7.5 |
| stearic (C$_{18}$) |  | (?) 3.0 |
| oleic |  | 5.0 |
| linoleic |  | 1.0 |

(a) Analysis of acids derived from representative sample from copra (J. Am. Chem. Soc., 49, 2829-31 (1927).
(b) Analysis of acids from kernel oil (J. Soc. Chem. Ind., 49, 67T (1925).

The primary alkyl acyl glycolates herein considered may be conveniently prepared by a double esterification as follows:

HOCH$_2$COOH + ROH $\longrightarrow$ HOCH$_2$COOR + H$_2$O
Glycolic acid + alcohol $\longrightarrow$ Alkyl glycolate + water HOCH$_2$COOR + R'COOH $\longrightarrow$ R'COOCH$_2$COOR + H$_2$O
Alkyl glycolate + fatty acid $\longrightarrow$ Alkyl acyl glycolate + water A second method of preparation consists in the condensation of a chloracetic ester and a fatty acid sodium salt with the expulsion of a sodium chloride molecule as follows:

$$ClCH_2COOH + ROH \longrightarrow ClCH_2COOR + H_2O$$
Chloracetic acid + alcohol $\longrightarrow$ Chloracetic ester + water $$ClCH_2COOR + NaOOCR' \longrightarrow R'COOCH_2COOR + NaCl$$
Chloracetic ester + fatty acid salt $\longrightarrow$ Alkyl acyl glycolate + salt The following examples illustrate the preparation of specific primary alkyl acyl glycolates adapted for use in the present invention:

EXAMPLE I

PREPARATION OF BUTYL "COCONOYL" GLYCOLATE BY ESTERIFICATION-CONDENSATION REACTIONS

The following reaction mixture is used:

| | |
|---|---:|
| Chloracetic acid grams | 906 |
| Butyl alcohol do | 725 |
| Ethylene dichloride do | 1000 |
| Hydrochloric acid (37.5%) cc | 10 |

In the above reaction mixture the first two components are reactants, the third is a carrier which serves to facilitate water removal, and the last is a catalyst.

This mixture is refluxed with continuous removal of water and carrier until 180.0 cc. of water are removed. The reaction mixture is then cooled, the acid catalyst neutralized by addition of calcium hydroxide, and the product filtered. This filtrate is heated and excess butyl alcohol and ethylene dichloride are distilled off. The following reaction has occurred:

$$ClCH_2COOH + CH_3(CH_2)_3OH \longrightarrow$$
Chloracetic acid + butyl alcohol $$ClCH_2COO(CH_2)_3CH_3 + H_2O$$
Butyl chloracetate + water To the residue, which is crude butyl chloracetate is added a molar equivalent of the sodium salts of coconut oil acids, portionwise, over a period of six hours. During this addition the temperature of the mixture is maintained at 170–190° C. The heating is continued for an additional nine hours. The product is cooled, then filtered and the filtrate neutralized by contact for 1.5–2 hours with hydrated lime. The liquid is then refiltered. This clear filtrate is distilled to obtain the product. Boiling point range of product removal is 125–240° C. at 4 mm. Hg pressure. The following reaction has occurred:

$$ClCH_2COO(CH_2)_3CH_3 + NaOOCR \longrightarrow$$
Butyl chloracetate + mixture of coconut oil acid soaps $$RCOOCH_2COO(CH_2)_3CH_3 + NaCl$$
Mixture of butyl acyl glycolates + sodium chloride NOTE.—Where R stands for saturated odd number hydrocarbon chains of from 7 to 17 carbon atoms.

EXAMPLE II

PREPARATION OF BUTYL LAUROYL GLYCOLATE BY DOUBLE ESTERIFICATION

| | Grams |
|---|---:|
| Butyl alcohol | 555 |
| Glycolic acid | 380 |
| Conc. sulfuric acid | 10 |

This mixture is refluxed until all water has been removed. The mixture is then neutralized with alkali, washed with water to remove salts, and distilled to remove excess butyl alcohol and water. The following reaction has occurred:

$$HOCH_2COOH + CH_3(CH_2)_3OH \longrightarrow$$
Glycolic acid + butyl alcohol $$HOCH_2COO(CH_2)_3CH_3 + H_2O$$
Butyl glycolate + water Using the butyl glycolate thus prepared, the following reaction mixture is made up:

| | Grams |
|---|---:|
| Toluene | 326 |
| Lauric acid | 306 |
| Butyl glycolate | 236 |
| Conc. sulfuric acid | 1 |

This mixture is refluxed 1.5 hours to remove all water, neutralized with alkali, washed, and distilled. The following reaction has occurred:

$$HOCH_2COO(CH_2)_3CH_3 + CH_3(CH_2)_{10}COOH \longrightarrow$$
Butyl glycolate + lauric acid $$CH_3(CH_2)_{10}COOCH_2COO(CH_2)_3CH_3 + H_2O$$
Butyl lauroyl glycolate + water

EXAMPLE III

PREPARATION OF METHYL "COCONOYL" GLYCOLATE BY ESTERIFICATION-CONDENSATION REACTIONS

Where the butyl alcohol of Example I is replaced by an alcohol whose boiling point is less than 100° C. at 760 mm. mercury pressure, the first stage reaction is changed by elimination of the carrier. In the present example methyl alcohol is used and a mixture is made up of:

| | Grams |
|---|---:|
| Methyl alcohol | 960 |
| Chloracetic acid | 1890 |

Hydrogen chloride gas is bubbled through this mixture until all of the chloracetic acid is dissolved. The reaction mixture is then allowed to stand overnight whereupon a two layer separation occurs. After decantation of the water-alcohol layer, the ester is washed with salt saturated water, then with salt saturated 5% sodium hydroxide solution. The ester is dried with calcium chloride and distilled over at 126–134° C. at 760 mm. mercury pressure and the product is neutralized with calcium hydroxide. Methyl chloracetate so prepared is condensed with the sodium salt of a fatty acid as in Example I to prepare the corresponding alkyl acyl glycolate.

The above three examples illustrate typical methods of preparing all of the primary alkyl acyl glycolates herein considered. Such glycolates include Methyl decanoyl glycolate
Propyl dodecanoyl glycolate
Isobutyl octanoyl glycolate
Isobutyl decanoyl glycolate
Amyl octanoyl glycolate
Butyl nonanoyl glycolate
Butyl "coconoyl" glycolate Certain of these primary alkyl acyl glycolates, for example, the butyl "coconoyl" glycolate of Example I, have been found to be excellent plasticizers for polyvinyl butyral resin for safety glass interlayers with respect to the toughness, adhesiveness, and stability of such sheeting, and particularly with respect to its retention of toughness at very low temperatures, but to be unsatisfactory for this use because of its tendency to exude from the sheeting under conditions of high humidity. However, such exudation of this mixture of butyl esters can be avoided in either of two ways without loss of the valuable characteristics of these glycolate plasticizers.

The first of these two ways is to eliminate from the mixture of glycolates, in this case butyl acyl glycolates, those individual compounds which are too volatile or which tend to exude from the plastic composition under conditions of high humidity. The second of these two ways is to use in admixture with the glycolates a proportion of lauryl alcohol or, more practically, the readily available commercial mixture of straight-chain alcohols of even numbers of carbon atoms from 8 to 18, inclusive, in which lauryl alcohol predominates, such commercial mixture being the full equivalent of lauryl alcohol in this invention.

Whether or not an individual or a mixture of the alkyl acyl glycolates will exude from a mixture with a polyvinyl butyral resin in proportions suitable for safety glass interlayer, i. e., in the neighborhood of 43 parts plasticizer to 100 parts resin by weight, can be predicted sufficiently accurately for purposes of the present invention by determining the so-called "cloud point" which characterizes a mixture of that plasticizer and of that resin in arbitrary standard proportions. This determination is conveniently made by dissolving 0.5 grams of the resin in 4.5 grams of the plasticizer with the assistance of heat and then cooling the resulting solution gradually in a test tube and noting the temperature when it becomes cloudy. When this temperature, which is designated the cloud point, is above about 110° C., then it can be assumed that exudation of the plasticizer will take place from a plastic comprising this resin and this plasticizer in proportions suitable for safety glass interlayers, that is, about 40 parts or more of the plasticizer per 100 parts of the resin. If, on the other hand, the cloud point is below about 110° C., freedom from exudation may be assumed. If the proportion of plasticizer to be used is smaller than that indicated above, the requirement as to cloud point may be somewhat relaxed.

The primary alkyl acyl glycolates have the general formula $R'COOCH_2COOR''$ wherein $R'$ and $R''$ are alkyl radicals. It has been determined that those members of this group of glycolates in which the sum of the respective numbers of carbon atoms in $R'$ and $R''$ is less than 9, are too volatile and hence should be excluded from the mixture on this ground.

From the standpoint of tendency to exude, the boundary between acceptable and unacceptable members of this glycolate group has been found to depend in part upon the constitution of the polyvinyl acetal resin with which the plasticizer is to be used. Specifically, for polyvinyl butyral resins of which the residual content of polyvinyl acetate is not in excess of about 2%, the determining element in the constitution is the percentage of unconverted polyvinyl alcohol in the resin.

This relationship is illustrated for normal primary alkyl acyl glycolates by the following data for various combinations of plasticizers and resins, the test for exudation being made in each case by exposing to 100% humidity for 48 hours a cast film containing 45 parts of plasticizer per 100 parts of resin.

*Table I*

| plasticizer | $R'$ | $R''$ | $R'+R''$ | percentages polyvinyl alcohol | exudation | cloud-point, °C. |
|---|---|---|---|---|---|---|
| methyl decanoyl glycolate | 9 | 1 | 10 | 18.9 | no | 84 |
| butyl octanoyl glycolate | 7 | 4 | 11 | 20.2 | yes | 115 |
| Do | 7 | 4 | 11 | 19.2 | no | 103 |
| Do | 7 | 4 | 11 | 18.0 | no | 90 |
| butyl nonanoyl glycolate | 8 | 4 | 12 | 19.2 | yes | |
| Do | 8 | 4 | 12 | 18.5 | no | |
| propyl decanoyl glycolate | 9 | 3 | 12 | 18.7 | no | 102 |
| amyl octanoyl glycolate | 7 | 5 | 12 | 18.9 | yes | 119 |
| Do | 7 | 5 | 12 | 18.0 | no | |
| butyl decanoyl glycolate | 9 | 4 | 13 | 18.9 | yes | 120 |
| Do | 9 | 4 | 13 | 17.2 | no | |
| propyl dodecanoyl glycolate | 11 | 3 | 14 | 17.5 | yes | |
| Do | 11 | 3 | 14 | 16.1 | no | |
| butyl tetradecanoyl glycolate | 13 | 4 | 17 | 14.0 | yes | |
| Do | 13 | 4 | 17 | 12.6 | no | |
| propyl hexadecanoyl glycolate | 15 | 3 | 18 | 12.9 | yes | |
| Do | 15 | 3 | 18 | 11.0 | no | |

Referring to the drawing forming a part of the present application, the single figure of the drawing shows a graph in which the ordinate is the sum of the carbon atoms in $R'$ and $R''$ and the abscissa is the percentage of polyvinyl alcohol in polyvinyl butyral. The straight line AB in the drawing shows graphically the boundary between acceptability and unacceptability of plasticizers for use with these resins in the proportion of 45 parts of plasticizer to 100 parts of resin. That is, combinations above this line, such as represented by point C, will be subject to exudation while combinations below this line, such as represented by point D, will be satisfactory.

The line AB may be represented by the equation $Y=28.2-0.853P$ in which Y is the sum of the number of carbon atoms in $R'$ and $R''$, and P is the percentage of polyvinyl alcohol, by weight, in the polyvinyl butyral resin.

Three restrictions have been observed in connection with the application of this equation and its corresponding line:

(1) When $(R'+R'')$ is less than 9, the plasticizer is objectionably volatile as already noted. Hence, no member of this family of plasticizers is useful for the purposes of the invention in connection with a polyvinyl butyral resin which contains more than 22% of polyvinyl alcohol. The line terminates at point B in the graph.

(2) In the other direction, the line terminates at A in the graph in the absence of experimental data for resins of less than about 10% content of polyvinyl alcohol, which represents substantially the commercial limit of resins of this type.

(3) The locus of acceptable plasticizer compositions is represented by the area ABE. Obviously, $(R'+R'')$ for any pure chemical compound must be a whole number but, with plasticizers representing mixtures of one or more of these compounds, i. e., butyl "coconoyl" glycolate, $(R'+R'')$ may be a fraction. In the case of mixtures of various alkyl and acyl groups, the weighted average of the various components is employed in expressing $R'$ and $R''$.

With a polyvinyl butyral resin of the type currently used in safety glass interlayer sheeting, the cloud point of a mixture of butyl acyl glycolates derived from coconut oil acids, is about 150° C., and a plastic made up of these ingredients in safety glass proportions will be subject to exudation. But when the content of polyvinyl alcohol in the resin is low, the mixture is free from exudation. It has been found that, when the content of hydroxyl groups in the resin, when calculated as percent by weight of polyvinyl alcohol, is 14.2% or less, there is no exudation with these compounds. A higher hydroxyl content will cause the compounds to exude.

Thus, this mixture of butyl acyl glycolates behaves in this respect like a single butyl acyl glycolate in which R' is 12 and R'' is 4, for which the critical content of polyvinyl alcohol in a butyral resin would be, according to the graph, about 14.2%. Actually, the average R' for this mixture, calculated from the analysis (a) above, is almost exactly 12.

It has been found that the isobutyl acyl glycolates follow a rule analogous to that just set forth for the butyl acyl glycolates except that a member of the former group in which $(R'+R'')$ is N, behaves like a member of the latter group in which $(R'+R'')$ is $(N+1)$.

Further, it has been found that the presence of the methyl group as R'' creates a minor exception to the rule above, in that the methyl group must be counted as zero instead of as 1 in computing $(R'+R'')$. This fact, however, merely creates a factor of safety in the application of the rule.

The first method of the use of these glycolate plasticizers, i. e., by exclusion of undesirable members of the group, is illustrated in Examples IV to XII in which different polyvinyl butyral resins are plasticized with respectively operative single individuals of the group in proportions useful in safety glass interlayer sheeting. When, however, the proportion of glycolate plasticizer to polyvinyl butyral resin is below about 40:100, the restriction of the choice of plasticizer, in terms of the mathematical relationship stated, may be relaxed somewhat: i. e., the horizontal lines in the graph may be extended somewhat to the right, to a higher boundary line. On the other hand, if the plasticizer is to be used in proportions higher than about 45:100, then the lines must be correspondingly shortened to a lower boundary line. Mixtures of operative individual compounds can be used in the same manner as single compounds. With polyvinyl acetal resins other than the polyvinyl butyral resins, analogous considerations will govern the choice of individual glycolate plasticizers.

The following examples in which all proportions are by weight unless otherwise noted, illustrate specific embodiments of the invention:

EXAMPLE IV

| | Parts |
|---|---|
| Polyvinyl butyral resin of constitution | 100 |
| Polyvinyl acetate, 0.5% | |
| Polyvinyl alcohol, 19.0% | |
| Polyvinyl butyral, 80.5% | |
| Isobutyl octanoyl glycolate | 45 |
| Ethanol | 61 |

These ingredients are mixed to a homogeneous dough and then rolled and shaped by heat and pressure into a block from which sheets are cut; the sheets are then seasoned for removal of the alcohol. The thickness of the seasoned sheeting is 0.015 inch.

It is composited between sheets of glass and the resulting pane of safety glass gives satisfactory performance under standard tests at 49° C. and −18° C. The plasticizer does not exude under severe conditions.

Interlayer sheetings of the compositions shown in Examples V to XII, inclusive, give similarly good results as those obtained Example IV. The sheets may be made by the procedure of Example IV or by any other convenient procedure, such as the commercial procedure of extrusion of continuous sheeting.

EXAMPLE V

| | Parts |
|---|---|
| Polyvinyl butyral resin of constitution | 100 |
| Polyvinyl acetate, 0.6% | |
| Polyvinyl alcohol, 19.0% | |
| Polyvinyl butyral, 80.4% | |
| Butyl octanoyl glycolate | 45 |

EXAMPLE VI

| | Parts |
|---|---|
| Polyvinyl butyral resin of constitution | 100 |
| Polyvinyl acetate, 0.6% | |
| Polyvinyl alcohol, 19.0% | |
| Polyvinyl butyral, 80.4% | |
| Methyl decanoyl glycolate | 45 |

EXAMPLE VII

| | Parts |
|---|---|
| Polyvinyl butyral resin of constitution | 100 |
| Polyvinyl acetate, 0.5% | |
| Polyvinyl alcohol, 19.0% | |
| Polyvinyl butyral, 81.5% | |
| Propyl decanoyl glycolate | 45 |

EXAMPLE VIII

| | Parts |
|---|---|
| Polyvinyl butyral resin of constitution | 100 |
| Polyvinyl acetate, 0.5% | |
| Polyvinyl alcohol, 19.0% | |
| Polyvinyl butyral, 81.5% | |
| Butyl nonanoyl glycolate | 43 |

EXAMPLE IX

| | Parts |
|---|---|
| Polyvinyl butyral resin of constitution | 100 |
| Polyvinyl acetate, 0.5% | |
| Polyvinyl alcohol, 19.0% | |
| Polyvinyl butyral, 81.5% | |
| Methyl dodecanoyl glycolate | 43 |

EXAMPLE X

| | Parts |
|---|---|
| Polyvinyl butyral resin of constitution | 100 |
| Polyvinyl acetate, 0.8% | |
| Polycinyl alcohol, 17.2% | |
| Polyvinyl butyral, 82.0% | |
| Isopropyl decanoyl glycolate | 40 |

EXAMPLE XI

| | Parts |
|---|---|
| Polyvinyl butyral resin of constitution | 100 |
| Polyvinyl acetate, 0.6% | |
| Polyvinyl alcohol, 16.7% | |
| Polyvinyl butyral, 82.7% | |
| Propyl dodecanoyl glycolate | 41 |

EXAMPLE XII

| | Parts |
|---|---|
| Polyvinyl butyral resin of constitution | 100 |
| Polyvinyl acetate, 0.6% | |
| Polyvinyl alcohol, 13.3% | |
| Polyvinyl butyral, 86.1% | |
| Butyl dodecanoyl glycolate | 42 |

The second method of avoiding exudation of mixtures of the group of primary alkyl acyl glycolates from interlayer sheeting of polyvinyl butyral resin in which they are used as the plasticizer, comprises using, in admixture therewith, an appropriate proportion of lauryl alcohol or of a commercial mixture of straight-chain alcohols of even numbers of carbon atoms between 8 and 18, inclusive, in which commercial mixture lauryl alcohol predominates. The proportion of lauryl alcohol, or its equivalent, to be used is dependent upon the composition of the acetal resin and upon the composition of the plasticizer. Thus, the plasticizer-resin composition designated by point C on the graph will require less of said alcohol to prevent exudation than will the plasticizer-resin composition designated by the point F. In any event, the proportion of this substance to be employed will vary between an upper limit of 33% by weight of its mixture with the glycolate plasticizer, and some lower value. In the case where the plasticizer comprises butyl "coconoyl" glycolate and the acetal resin consists of polyvinyl butyral resin suitable for safety glass interlayer sheets, i. e., polyvinyl butyral resin containing not more than 2% polyvinyl acetate by weight and between about 17% and 20% polyvinyl alcohol by weight, the proportion of lauryl alcohol or its equivalent to be used is between about 25% and 33% by weight of its mixture with the glycolate plasticizer. The upper limit is imposed by the appreciable volatility of lauryl alcohol and its close homologues from safety glass interlayer sheets under conditions of service.

In the selection of the amount of lauryl alcohol or its equivalent for use in conjunction with a mixture of alkyl acyl glycolates as a plasticizer with a given polyvinyl butyral resin, the cloud point test may be used as a guide, by determining the cloud points of mixtures involving various proportions of the lauryl alcohol and selecting a proportion corresponding to a cloud point not in excess of 110° C. and preferably somewhat lower.

The following are typical commercial mixtures of straight-chain alcohols of even numbers of carbon atoms between 8 and 18, inclusive, which mixtures are equivalent to lauryl alcohol for purposes of the present invention:

|  | a | c |
|---|---|---|
| $C_8$ (octyl) |  | 0.2 |
| $C_{10}$ (decyl) |  | 3.5 |
| $C_{12}$ (lauryl) | 58 | 59.0 |
| $C_{14}$ (myristyl) | 21 | 21.9 |
| $C_{16}$ (cetyl) | 12 | 11.4 |
| $C_{18}$ (stearyl) | 8 | 4.0 |
|  | 100 | 100.0 |

The following Examples XIII to XVI illustrate the use of lauryl alcohol (or its commercial equivalent, designated "Mixture of aliphatic alcohols") with mixtures of alkyl acyl glycolates derived from coconut oil acids (designated alkyl "coconoyl" glycolates) in general. It will not be feasible to use single glycolate plasticizers and resins in combinations which fall much above the line AB of the graph, and to rely upon lauryl alcohol to prevent exudation. This can be done in some cases where the tendency to exude is not pronounced, but lauryl alcohol, in usable proportions, is effective chiefly in conjunction with mixtures composed only in part of exuding individual glycolates.

EXAMPLE XIII

Parts
Polyvinyl butyral resin of constitution_____ 100
  Polyvinyl acetate, 1.0%
  Polyvinyl alcohol, 19.0%
  Polyvinyl butyral, 80.0%
Butyl "coconoyl" glycolate_____ 35
Mixture of aliphatic alcohols_____ 12
Ethanol _____ 61

These ingredients are mixed to a homogeneous dough, which is then rolled and shaped by heat and pressure into a block. Sheets are cut from the block and then seasoned for removal of the alcohol. The thickness of the seasoned sheeting is 0.015 inch. It is composited between sheets of glass, and the resulting pane of safety glass gives satisfactory performance under standard tests at 49° C. and —18° C.

Equally satisfactory results are obtained with interlayer sheetings of the following compositions:

EXAMPLE XIV

Parts
Polyvinyl butyral resin of constitution_____ 100
  Polyvinyl acetate, 1.0%
  Polyvinyl alcohol, 19.0%
  Polyvinyl butyral, 80.0%
Butyl "coconoyl" glycolate_____ 32
Mixture of aliphatic alcohols_____ 13

EXAMPLE XV

Parts
Polyvinyl butyral resin of constitution_____ 100
  Polyvinyl acetate, 1.0%
  Polyvinyl alcohol, 19.0%
  Polyvinyl butyral, 80.0%
Isobutyl "coconoyl" glycolate_____ 35
Mixture of aliphatic alcohols_____ 12

EXAMPLE XVI

Parts
Polyvinyl butyral resin of constitution_____ 69
  Polyvinyl acetate, 1.0%
  Polyvinyl alcohol, 14.2%
  Polyvinyl butyral, 84.8%
Butyl "coconoyl" glycolate_____ 31
Ethanol _____ 80

These ingredients are mixed to a viscous, homogeneous solution which is cast as a thin film upon a glass plate. The solvent is evaporated therefrom, and the resulting film is stripped from the glass. This film is then seasoned for 24 hours at 70° C.

No exudation of the plasticizer from the resin film results when the same is placed for 48 hours at 25° C. in 100% humidity. The cloud point of the plasticizer-resin combination of this example is 70° C.

It will be understood that the above examples are merely illustrative and particularly relate to plastic compositions adapted for use in interlayer sheeting for safety glass. However, the invention is of much more general application in that the glycolates herein considered are useful in compatible admixture with polyvinyl acetals for a wide variety of plastic applications.

A number of primary alkyl acyl glycolates have been disclosed and it has been found that this class of compounds is useful for plasticizing polyvinyl acetals so long as the compound falls within the limits of the formula $R'COOCH_2COOR''$ in $R'$ and $R''$ are alkyl groups, $R'$ has from 7 to 17 carbon atoms, inclusive, $R''$ has from 1 to 6 carbon atoms, inclusive, and the total of carbon atoms in $R'$ and $R''$ is at least 9.

While the polyvinyl butyrals are outstandingly adapted for use in safety glass interlayer sheeting, the resins obtained by esterifying polyvinyl alcohol with other aldehydes such as acetaldehyde, propionaldehyde, butyraldehyde, valeraldehyde, and hexaldehyde, are also known to be useful for this purpose as fully set forth in Reid U. S. Patent 2,120,628 patented June 14, 1938, and the glycolates herein considered may be used with such polyvinyl acetals. Also, these glycolates may be used in compatible admixture with these polyvinyl acetals in which the polyvinyl alcohol content falls outside the limits considered suitable where the plastic is to be used for interlayer sheeting, such polyvinyl acetal compositions being used for other plastic purposes, coating fabrics, adhesives and the like.

The invention is particularly concerned with plastic compositions adapted for use as interlayer sheeting for safety glass. In such plastics it is preferred to use, per 100 parts of the polyvinyl acetal by weight, from 40 to 45 parts of the glycolate although, when the glycolate is used in combination with lauryl alcohol or its commercial equivalent, the upper range of total plasticizer may be increased to 50 parts. The lauryl alcohol normally is used in a proportion of 25% to 33% by weight of its mixture with the glycolate.

The present invention provides a new class of organic plasticizers for polyvinyl acetal resins. Safety glass interlayer compositions using these plasticizers are especially advantageous due to the fact that they exhibit excellent retention of toughness at very low temperatures while being characterized in other respects by entirely acceptable properties.

This application is a continuation-in-part of applicants' copending application Serial No. 500,652, filed August 31, 1943, now abandoned.

As many apparently widely different embodiments of this invention may be made without departing from the spirit and scope thereof, it is to be understood that the invention is not limited to the specific embodiments thereof except as defined in the appended claims.

We claim:

1. A plastic composition comprising a polyvinyl acetal and, in compatible admixture therewith, a plasticizer comprising a primary alkyl acyl glycolate having the formula $R'COOCH_2COOR''$ in which $R'$ and $R''$ are alkyl groups, $R'$ has from 7 to 17 carbon atoms, inclusive, $R''$ has from 1 to 6 carbon atoms, inclusive, and the total of carbon atoms in $R'$ and $R''$ is at least 9.

2. A plastic composition comprising a polyvinyl butyral containing from 10% to 22% by weight of polyvinyl alcohol and not more than 2% of polyvinyl acetate, and, in compatible admixture therewith, a plasticizer comprising a primary alkyl glycolate having the formula $R'COOCH_2COOR''$ in which $R'$ and $R''$ are alkyl groups, $R'$ has from 7 to 17 carbon atoms, inclusive, $R''$ has from 1 to 6 carbon atoms, inclusive, and the total of carbon atoms in $R'$ and $R''$ is at least 9.

3. A plastic composition comprising a polyvinyl butyral containing from 10% to 22% by weight of polyvinyl alcohol and not more than 2% of polyvinyl acetate, and, in compatible admixture therewith, a plasticizer comprising lauryl alcohol and a mixture of primary alkyl acyl glycolates obtained by esterification of the acids resulting from the saponification of coconut oil, with an alkyl glycolate in which alkyl glycolate the alkyl radical contains from 1 to 6 carbon atoms, inclusive.

4. A plastic composition comprising a polyvinyl butyral resin containing from 10% to 22%, by weight of polyvinyl alcohol and not more than 2% of polyvinyl acetate, and, in compatible admixture therewith, a primary butyl acyl glycolate having the formula $R'COOCH_2COOC_4H_9$ in which $R'$ is an alkyl radical having from 7 to 17 carbon atoms, inclusive.

5. A plastic composition comprising, by weight, 100 parts of a polyvinyl acetal and, in compatible admixture therewith, 40-45 parts of a plasticizer comprising a primary alkyl acyl glycolate having the formula $R'COOCH_2COOR''$ in which $R'$ and $R''$ are alkyl groups, $R'$ has from 7 to 17 carbon atoms, inclusive, $R''$ has from 1 to 6 carbon atoms, inclusive, and the total of carbon atoms in $R'$ and $R''$ is at least 9.

6. A plastic composition comprising, by weight, 100 parts of a polyvinyl butyral containing from 10% to 22% by weight of polyvinyl alcohol and not more than 2% of polyvinyl acetate, and, in compatible admixture therewith, 40-45 parts of a plasticizer comprising a primary alkyl acyl glycolate having the formula $R'COOCH_2COOR''$ in which $R'$ and $R''$ are alkyl groups, $R'$ has from 7 to 17 carbon atoms, inclusive, $R''$ has from 1 to 6 carbon atoms, inclusive, and the total of carbon atoms in $R'$ and $R''$ is at least 9.

7. A plastic composition comprising, by weight, 100 parts of a polyvinyl butyral containing from 10% to 22% by weight of polyvinyl alcohol and not more than 2% of polyvinyl acetate, and, in compatible admixture therewith, 40-45 parts of a plasticizer comprising a primary butyl acyl glycolate having the formula $R'COOCH_2COOC_4H_9$ in which $R'$ is an alkyl radical having from 7 to 17 carbon atoms, inclusive.

8. A plastic composition comprising, by weight, 100 parts of a polyvinyl butyral containing from 10% to 22% of polyvinyl alcohol and not more than 2% of polyvinyl acetate, and, in compatible admixture therewith, 40-50 parts of a plasticizer consisting of 67% to 75% of a primary butyl acyl glycolate having the formula $R'COOCH_2COOC_4H_9$ in which $R'$ is an alkyl radical having from 7 to 17 carbon atoms, inclusive, and 33% to 25% of lauryl alcohol.

BOZETECH C. BREN.
JESSE O. WHITE.

REFERENCES CITED

The following references are of record in the file of this patent:

UNITED STATES PATENTS

| Number | Name | Date |
|---|---|---|
| 2,109,573 | Marks | Mar. 1, 1938 |
| 2,120,628 | Reid | June 14, 1938 |
| 2,122,716 | Graves | July 5, 1938 |
| 2,184,426 | Kocher et al. | Dec. 26, 1939 |
| 2,217,163 | Fletcher | Oct. 8, 1940 |